Figure 1:
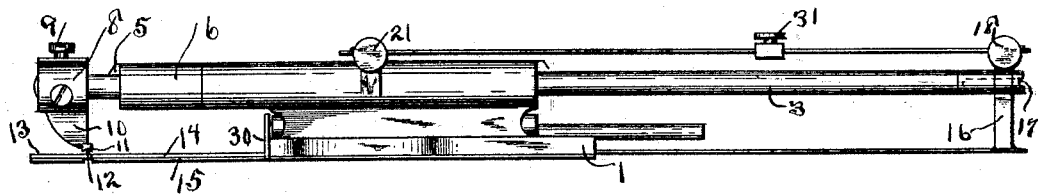

(No Model.) 2 Sheets—Sheet 1.

H. R. CORKHILL, Jr. & F. J. SHIELDS.
TUCK MARKER FOR SEWING MACHINES.

No. 497,950. Patented May 23, 1893.

WITNESSES:
H. E. N. Bates
Thomas Durant

INVENTORS
Henry R. Corkhill Jr.
Frank J. Shields
BY
Church & Church
Their ATTORNEYS

THE NORRIS PETERS CO., PHOTO-LITHO., WASHINGTON, D. C.

(No Model.) 2 Sheets—Sheet 2.

H. R. CORKHILL, Jr. & F. J. SHIELDS.
TUCK MARKER FOR SEWING MACHINES.

No. 497,950. Patented May 23, 1893.

WITNESSES: INVENTORS:
H. E. Bates. Henry R. Corkhill Jr.
Thomas Durant & Frank J. Shields
BY Church & Church
their ATTORNEYS

THE NORRIS PETERS CO., PHOTO-LITHO., WASHINGTON, D. C.

UNITED STATES PATENT OFFICE.

HENRY R. CORKHILL, JR., AND FRANK J. SHIELDS, OF ROCHESTER, NEW YORK.

TUCK-MARKER FOR SEWING-MACHINES.

SPECIFICATION forming part of Letters Patent No. 497,950, dated May 23, 1893.

Application filed October 29, 1892. Serial No. 450,351. (No model.)

*To all whom it may concern:*

Be it known that we, HENRY R. CORKHILL, Jr., and FRANK J. SHIELDS, of Rochester, in the county of Monroe and State of New York, have invented certain new and useful Improvements in Sewing-Machine Tuckers; and we do hereby declare the following to be a full, clear, and exact description of the same, reference being had to the accompanying drawings, forming a part of this specification, and to the reference numerals and letters marked thereon.

Our present invention has for its objects to provide a sewing machine tucker, simple and cheap in construction, readily applicable to power-operated machines and capable of adjustment by an unskilled operator, so that tucks of uniform width may be marked and sewed and the first of a group of tucks a greater distance apart may be marked and the marker returned to first position for marking the uniform tucks, without liability of losing the first adjustment, and to these and other ends the invention consists of certain novelties of construction and combinations of parts, all as will be hereinafter fully described and the novel features pointed out particularly in the claims at the end of this specification.

Figure 2:
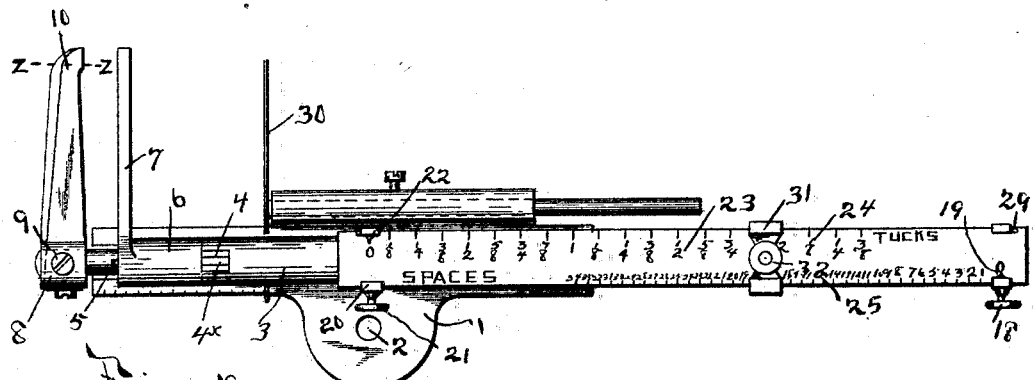
Figure 3:
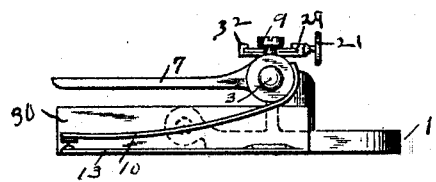
Figure 4:
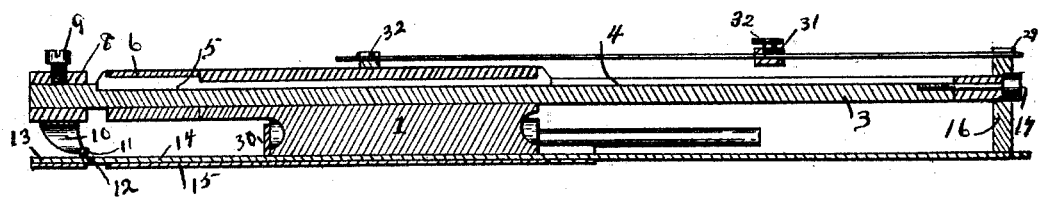
Figure 5:
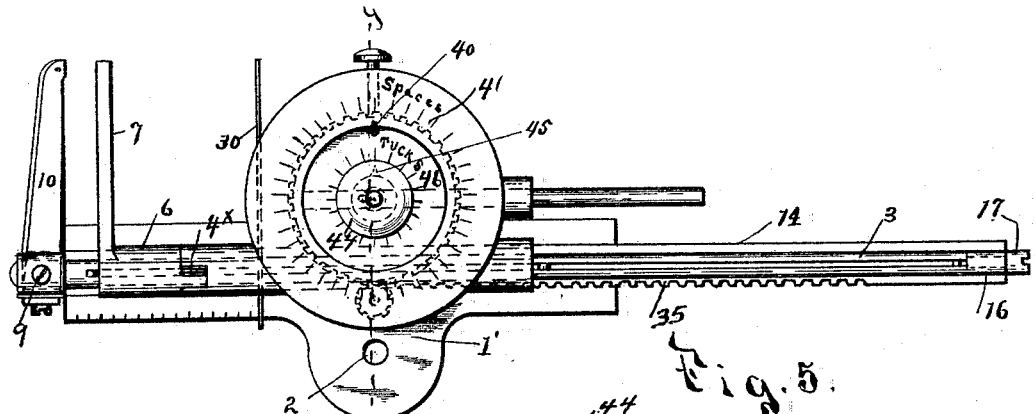
Figure 6:
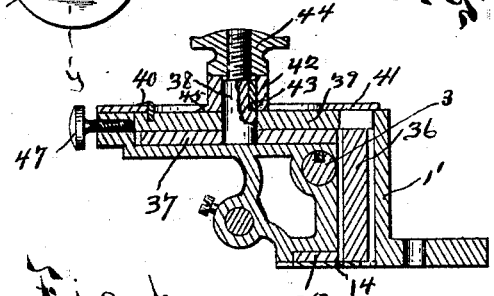
Figure 7:
Figure 8:

In the drawings: Figure 1 is a side elevation of one form of tucker constructed in accordance with our invention; Fig. 2, a plan view of the same; Fig. 3, an end view; Fig. 4, a longitudinal sectional view; Fig. 5, a plan view of a modification; Fig. 6, a section on the line $y$—$y$ of Fig. 5; Fig. 7, a sectional view of a piece of material showing groups of tucks; Fig. 8, a section on the line $z$—$z$ of Fig. 2.

Similar reference numerals and letters indicate similar parts in the several figures.

The main frame or body portion 1 consists of a suitable casting having an aperture 2 for the passage of a screw adapted to fasten the attachment to the bed or table of a sewing-machine of any desired type; this frame having a tubular bearing in which slides a rock shaft 3 provided with a longitudinal groove 4 in which operates a spline or key 5, the said spline being reduced at the portion passing through the tubular bearing in the frame, but having the larger end engaging the main frame and a slot in the sleeve 6 on an arm 7 upon which latter the needle arm of the sewing-machine is adapted to operate preferably only when moving downwardly in the usual manner. The enlarged rear end of this key 4 enters a slot $4^x$ in the end of the frame 1 and prevents the longitudinal movement of the arm and key relative to the frame, and limits the rocking motion, though it permits the shaft and arm to rock or oscillate the necessary amount. Upon the outer end of the shaft 3, a collar 8 is secured by a set screw 9, which collar has secured to it a tuck marking arm 10 consisting of a leaf spring having at its end a block or projection 11 provided with a slot or recess adapted to co-operate with a projecting lug or flange 12 on the extension 13 of a plate 14 sliding in the lower portion of the frame, said plate 14 being secured in place by a bottom covering plate 15. Fastened to the outer end of the plate 14 is a standard 16 through which passes a screw or stud 17 fastened to the end of the shaft 3 and turning freely in the standard. Upon the upper end of this standard is formed a yoke or way provided at one side with a set screw 18 and an index 19, and upon the top of the main frame 1 is provided a similar yoke 20 having a set screw 21 and an index 22, and arranged to slide in these two yokes is a scale bar or plate 23 having two scales 24 and 25 thereon, one of these scales, say 24, indicating the various widths of tucks it may be desirable to make, and adapted to co-operate with the index 22, and the other scale 25 indicating spaces between the tucks, or groups of tucks, and arranged to co-operate with the index 19.

It will be understood that the needle arm of the sewing-machine operates near the arm 7 so that at each reciprocation of the needle in sewing a tuck, the arm 7 will be engaged and moved down, turning the shaft 3 in its bearings and bringing the spring marking arm 10 down, the co-operating block 11 and lug 12 forming the crease for the tuck said spring arm returning the shaft to upper position after actuation, and it will be noted that the spring 10 is so secured to the shaft that it has a drawing as well as a vertical motion, which not only accomplishes the creasing in a better manner, but prevents the excessive jar that would otherwise be given the parts, which renders other forms of tuck markers having a straight, vertical motion undesirable for use on power operated machines. In the position in which the parts are shown in Figs. 1 and 2 the marker arms are as near the needle as they would come when marking the narrowest tuck and the indices 19 and 22 co-operate with the zero points on the scale bar which is secured to both the yokes on the plate 14 and main frame 1.

Suppose now it is desired to mark tucks three-eighths of an inch wide, or any other width desired, the set screw 21 is loosened and the plate 14 carrying the shaft and marker is moved outward until the proper mark on the "tuck" scale is opposite the index 22 and the screw 21 is then tightened and the operation is proceeded with as usual sewing one tuck and marking the next, the edge guide 30 being adjusted the proper distance as will be understood. Now, if it is desired to form a group of tucks, or a single tuck, at some distance from the one last marked it is unnecessary to disturb, or change, the adjustment of the scale relative to the index 22 and thus lose this indication, but only to loosen the set screw 18, move the plate 14 and shaft outward until the index 19 indicates on the scale 25 the correct number or distance, then tighten up the screw 18 and proceed in the usual manner to sew the last short tuck as shown at *a* in Fig. 7, while the marker will crease the cloth at *b* being a distance from *a* equal to the length of the usual tuck plus the amount of space the marker has been adjusted. Now to return to marking the short tucks the regular distance apart and sew them, it is only necessary to loosen the screw 18 again and move the plate 14, and the marker to the right until the index 19 is at zero or the first mark on the scale, which is facilitated by the employment of a stop pin 29 engaging the yoke at the top of standard 16 and the operation may be proceeded with as before. Each time the spaces are indicated the marker is moved a distance from the needle equal to that required for the normal tuck and the space between them, and is returned to position required for the normal tuck without the necessity, existing heretofore, of a calculation which it is difficult for unskilled operators to make.

For the purpose of facilitating the operation of marking the first tuck of a new group without even the requirement of consulting the scale bar we provide a removable yoke or collar 31 embracing and movable on the scale plate adapted to be secured by a set screw 32 at any mark on the scale, so that the yoke 31 being adjusted to the required space mark once, in order to mark the first tuck of a group, it is only necessary to loosen screw 18 and move the marker and shaft out until the yoke on standard 16 engages the yoke 31 and then secure the screw 18 and operate as before, and this gage is then set for marking the first tuck of every subsequent group and no calculation is necessary on the part of the operator.

In Figs. 5 and 6 is shown a modification of our invention in which a circular scale and rotary index is employed the edge of the plate or bar 14 being in this instance provided with a rack 35 engaging a long pinion 36 journaled in the main frame or body 1', said frame having at its upper portion a recess in which is located a gear wheel 37 meshing with the long pinion 36 arranged in the frame, said gear having a central stud 38 on which is loosely mounted a disk 39 carrying an index 40 cooperating with a scale 41 on the cover plate of the recessed portion, said scale indicating spaces between groups of tucks. Arranged upon the stud 38 above the disk is a collar 42 connected by a spline or key 43 with the stud and capable of a slight vertical movement caused by a set nut 44 on the end of the stud for clamping the disk 39 and gear 37 together when desired. This collar 42 is provided with an index 45 cooperating with a scale 46 on the disk 39, said scale indicating the size of tucks. A clamping screw 47 serves to hold the disk 39 stationary when desired. The construction of the shaft, marker and edge guide is the same in this arrangement as in the device previously described. In using this form of device, the marking arms are moved in as close to the needle as is usual, the indices 40 and 45 being at the zero mark on their respective scales, the clamping screw 47 is then tightened and the nut 44 loosened thereby disengaging the disk and gear; then the marker is moved out until the index 45 indicates the tuck desired on its scale when nut 44 is tightened, the operation of marking uniform tucks is proceeded with in the usual manner. When, however, it is desired to form a new group of tucks some distance from the last of the preceding one, the screw 47 is loosened and the marker moved out (turning the disk clamped to the gear) until the index 40 indicates the proper space on the scale 41, when the screw 47 is tightened and the first tuck of the new group marked; then the screw 47 is loosened, the marker drawn in until the index 40 is at zero and the screw tightened and the usual operation proceeded with as will be understood.

Instead of placing the index 40 on the disk 39 and the scale 41 on the ring around it, it is obvious that both scales 41 and 46 could be located on the disk 39 and the index 40 located on the ring on the main frame and if this were done the resemblance between the construction shown in Figs. 1 to 4 and that in Figs. 5 and 6 would be more apparent. Also this arrangement would obviate the necessity of marking but one part and when the devices are made in quantity the disks 39 can be stamped out of sheet metal, as will be understood.

The plate 14 and the shaft connected thereto constitute a marking frame carrying the marking points.

While we prefer to employ two detachable connections in our device, one between the marking frame and the scale or plate and the other between the main frame and said plate, it is obvious that the connection between the main frame and plate could be dispensed with when a construction such for instance as that shown in Figs. 5 and 6 is employed. In this instance, the screw 47 could be removed and the disk 39 could be held by hand with the index at zero, while the adjustment for the necessary width of tuck was made, and afterward in order to form the first tuck of a new group of tucks, the marking frame could be adjusted and the disk 39 rotated until the proper point was indicated on the scale on the main frame, and then friction alone would serve to hold the parts in this position, so that one or more tucks could be marked without further securing.

By the employment of this invention we have found in practice that unskilled operators make uniform groups of tucks in a very much more expeditious manner than by any tuck marker in which it is necessary to change the tuck gage and lose this adjustment every time a new group of tucks is to be made.

The modification shown herein in Figs. 5 and 6 is only one form and other arrangements for accomplishing the same purpose will readily suggest themselves to those skilled in the art and we therefore do not desire to be confined to precisely the construction shown.

We claim as our invention—

1. In a tuck marker, the combination with the frame or support and the marking frame carrying the cooperating cloth-marking points adjustable on the frame, of a scale or plate movable on the frame, detachable connections between said plate and the marking frame and indicia between the plate and frame and between the plate and marking frame whereby the adjustment of the marking frame relative to the plate and of the plate relative to the main frame can be determined, substantially as described.

2. In a tuck marker, the combination with the main frame, and the marking frame adjustable thereon, of the scale or plate movable on the frame, detachable connections between the marking frame and the plate and between the main frame and the plate and indicia between the marking frame and the plate and between the plate and the main frame, whereby the adjustment of the marking frame relative to the plate and of the plate relative to the main frame can be determined and the parts secured, substantially as described.

3. In a tuck marker, the combination with the main frame and the marking frame adjustable thereon, of the scale or plate movable on the frame, detachable connections between the marking frame and the plate and between the main frame and the plate, indicia between the plate and main frame indicating their relative movements and an adjustable stop on the plate for engaging the marking frame and limiting its movement relative to the plate, substantially as described.

4. In a tuck marker, the combination with the main frame of the marker frame adjustable thereon, the scale or plate having two scales thereon, a clamp on the main frame for engaging the plate, and an index thereon cooperating with one scale on the plate, a clamp on the marker frame, and an index thereon cooperating with the other scale on the plate, substantially as described.

5. In a tuck-marker, the combination with the main frame, the longitudinally adjustable grooved rock shaft journaled therein, the rock arm and the spline or key connected to the arm and operating in the groove in the shaft, both of its ends engaging the frame, of the tuck marking point connected to the shaft, the plate sliding in the frame and connected to the shaft and the marking point thereon, substantially as described.

HENRY R. CORKHILL, Jr.
FRANK J. SHIELDS.

Witnesses.
FRED F. CHURCH,
G. A. RODA.